(12) United States Patent
Tamura (10) Patent No.: US 6,619,982 B2
(45) Date of Patent: Sep. 16, 2003

(54) CHARGE ADAPTER FOR CHARGING AND PERFORMING DATA COMMUNICATIONS

(75) Inventor: Shigenori Tamura, Toyama-Ken (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 10/175,604

(22) Filed: Jun. 18, 2002

(65) Prior Publication Data

US 2003/0073346 A1 Apr. 17, 2003

(30) Foreign Application Priority Data

Oct. 11, 2001 (JP) ........................................ 2001-313705

(51) Int. Cl.[7] .............................................. H01R 35/00
(52) U.S. Cl. ......................... 439/534; 439/929; 439/13; 439/6; 439/10
(58) Field of Search ................................ 439/534, 929, 439/6, 10, 11, 13

(56) References Cited

U.S. PATENT DOCUMENTS

| 4,785,240 | A | * | 11/1988 | Newell et al. ................. 439/13 |
| 5,445,540 | A | * | 8/1995 | Barrand ....................... 439/929 |
| 5,466,170 | A | * | 11/1995 | Pavek ......................... 439/534 |
| 6,118,643 | A | * | 9/2000 | Dyer et al. .................... 439/13 |
| 6,290,534 | B1 | * | 9/2001 | Sadler ......................... 439/534 |

FOREIGN PATENT DOCUMENTS

| JP | 2000-134807 | 5/2000 |
| JP | 2000-315529 | 11/2000 |

* cited by examiner

*Primary Examiner*—Tho D. Ta
(74) *Attorney, Agent, or Firm*—Darby & Darby (57) ABSTRACT

A rotor case on a charge adapter has a first rotational position for holding a cellular phone in an upright position, and a second rotational position for holding a cellular phone in a tilted position. The upright position is suitable for holding the cellular phone during charging only, while the tilted position holds the cellular phone while permitting connection of a data connector to the bottom of the cellular phone. The rotor case has a generally prismatic shape with an eccentrically located rotational connection to the remainder of the charge adapter. The eccentric rotational location moves the center of gravity of the cellular phone to maintain stable positioning of the center of gravity of the cellular phone in both the upright charging-only position and the tilted charging-communicating position.

7 Claims, 10 Drawing Sheets

PRIOR ART

Fig. 16

CHARGE ADAPTER FOR CHARGING AND PERFORMING DATA COMMUNICATIONS

BACKGROUND OF THE INVENTION

1. Field of the Invention

The present invention relates to a charge adapter for a wireless communication terminal such as a cellular phone for easily switching the contact surfaces alternately between a state only for charging and a state for simultaneously charging and performing data communication using a communication cable.

2. Description of the Related Art

A battery is built into, or is integrally mounted on a wireless communication device such as a cellular phone. Usually, a main unit of the cellular phone is simply mounted on a cradle, or the like, in a charge adapter for charging when the battery is exhausted.

Recently, cellular phones are often connected to a personal computer through a data communication cable for mutual data transmission between the cellar phone and the personal computer, or wireless data communication. While there is no problem when the cellar phone is simply charged on the charge adapter, the communication function may be disconnected when the battery of the cellular phone is exhausted during the data communication.

Figure 16:
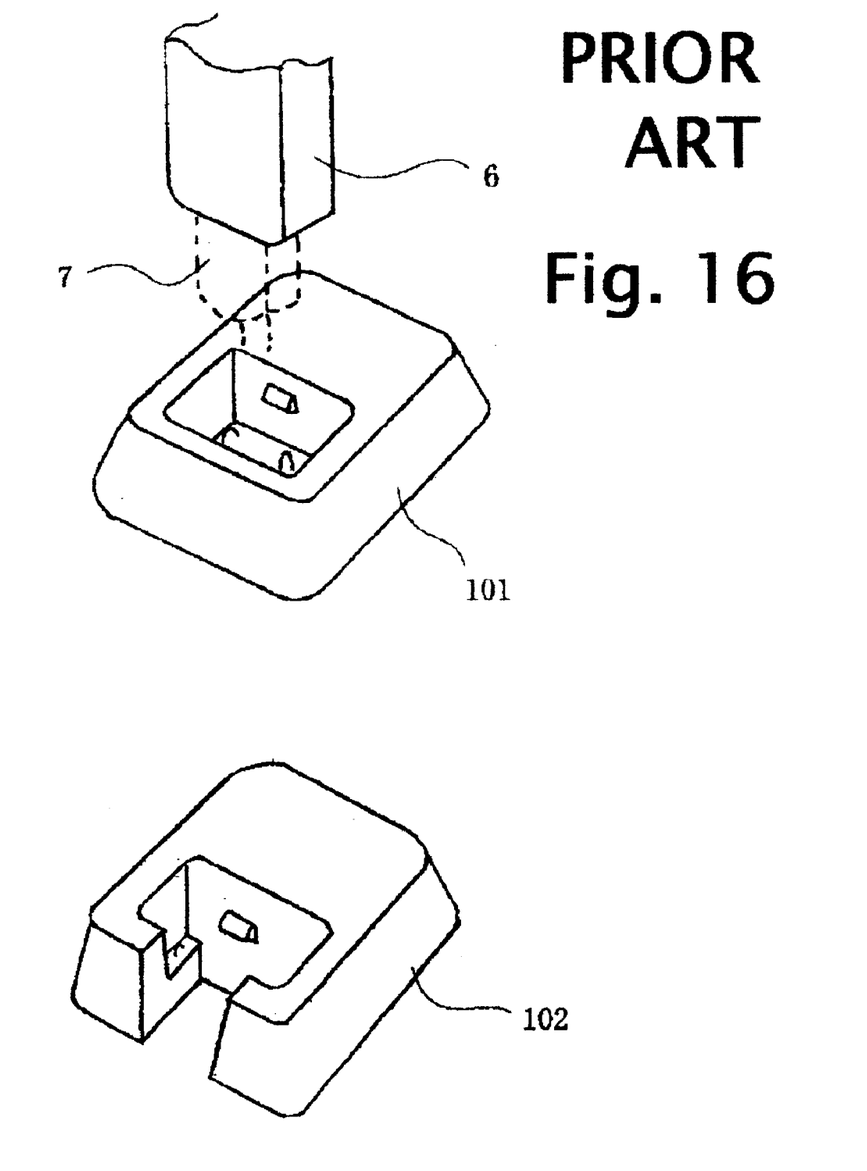
FIG. 16 shows an example of a conventional charge adapter.

Thus, the need is increasing to be able to charge during data communication. However, because both connection terminals for the data communication cable, and terminals for charging are generally located around the bottom of the cellular phone, when the cellar phone is mounted on the charge adapter as shown in FIG. 16, a communication cable plug 7 interferes with a contact surface of the charge adapter 101 or 102, so that the charge adapter cannot be connected to the cellular phone.

OBJECTS AND SUMMARY OF THE INVENTION

In view of the foregoing, an object of the present invention is to provide a compact charge adapter which has high mounting stability for preventing the cell phone from falling, and which easily switches contact surfaces alternately between one suitable for mounting a cellular phone in an upright state only for charging, and one suitable for mounting in a tilted state for connecting a data communication plug to the bottom of the cellular phone thereby permitting communicating during charging To solve the above-mentioned problems, the present inventor has studied the shape and the structure of a charge adapter which mounts a cellular phone in an upright state for reducing a required space when the cellular phone is simply charged, and for securing a contact stability, and mounts the cellular phone in a tilted state for connecting a plug for a data communication cable with the bottom, and for operating buttons when the cellular phone is used for data communication while being charged.

A charge adapter according to a first aspect of the present invention comprises charging terminals for contacting charging terminals of a battery provided for a cellar phone, a main unit case having a recess for mounting and fixing a main unit of the cellular phone during charging, and a rotor case rotatably provided on a side surface (a rear surface) of the main unit case, the rotor case including a first contact surface for coming in contact with ground when the cellular phone is mounted in an upright state, and a second contact surface for coming in contact with ground when the cellular phone is mounted in a tilted state.

With this charge adapter, when a cellular phone is mounted in the upright state, the first contact surface of the rotor case faces down, and when the cellar phone is mounted in the tilted state, the rotor case is turned, and the main unit case of the charge adapter is set horizontally so that the second contact surface of the rotor case faces down.

A charge adapter according to a second aspect of the invention is the charge adapter according to the first aspect, characterized in that a bottom of the recess for mounting and fixing the cellular phone has an opened arm shape, and a plug for a data communication cable is inserted from the bottom side of the main unit case through the arm shape when the cellular phone is mounted in the tilted state.

As a result, when the rotor case of the charge adapter is turned with the second contact surface facing down, and a cellular phone is mounted in the tilted state, because the mounting part of the charge adapter has the arm shape, and has an opening at the bottom, access is available for connection of the plug for the data communication cable through this part.

Thus, as long as the bottom of the recess for mounting a cellular phone has an opening, the arm shape may have separate arms, or may form a ring.

A charge adapter according to a third aspect of the present invention is the charge adapter according to the first or second aspect, characterized in that the rotor case has an approximately triangular prism shape having the first contact surface and the second contact surface as side surfaces with respect to a mounting surface of the main unit case of the charge adapter.

As a result, when the cellular phone is mounted in the upright state while the first contact surface of the rotor case faces down, the contact area is wide, and the charge adapter is stable and compact. When the rotor case is turned, and the main unit case of the charge adapter is horizontal with the second contact surface facing down, the upper part of the cellular phone faces obliquely upward.

A charge adapter according to a fourth aspect of the invention is the charge adapter according to any one of the first to third aspects, characterized in that a tuning center of the rotor case is eccentrically set upward against a center in a vertical direction of the mounting surface of the main unit case of the charge adapter.

As a result, the side surface on the contact side of the approximately triangular prism is enlarged for increasing contact stability of the charge adapter in a state where the first contact surface of the rotor case faces down when the cellular phone is mounted in the upright state. Further, when the rotor case is turned and the second contact surface faces down, a contact point on the rotor case is provided further out from the center of gravity of the main unit case of the charge adapter because the turning center of the rotor case is eccentrically set upward. Thus, attitude stability increases when the cellular phone is mounted in the tilted state.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
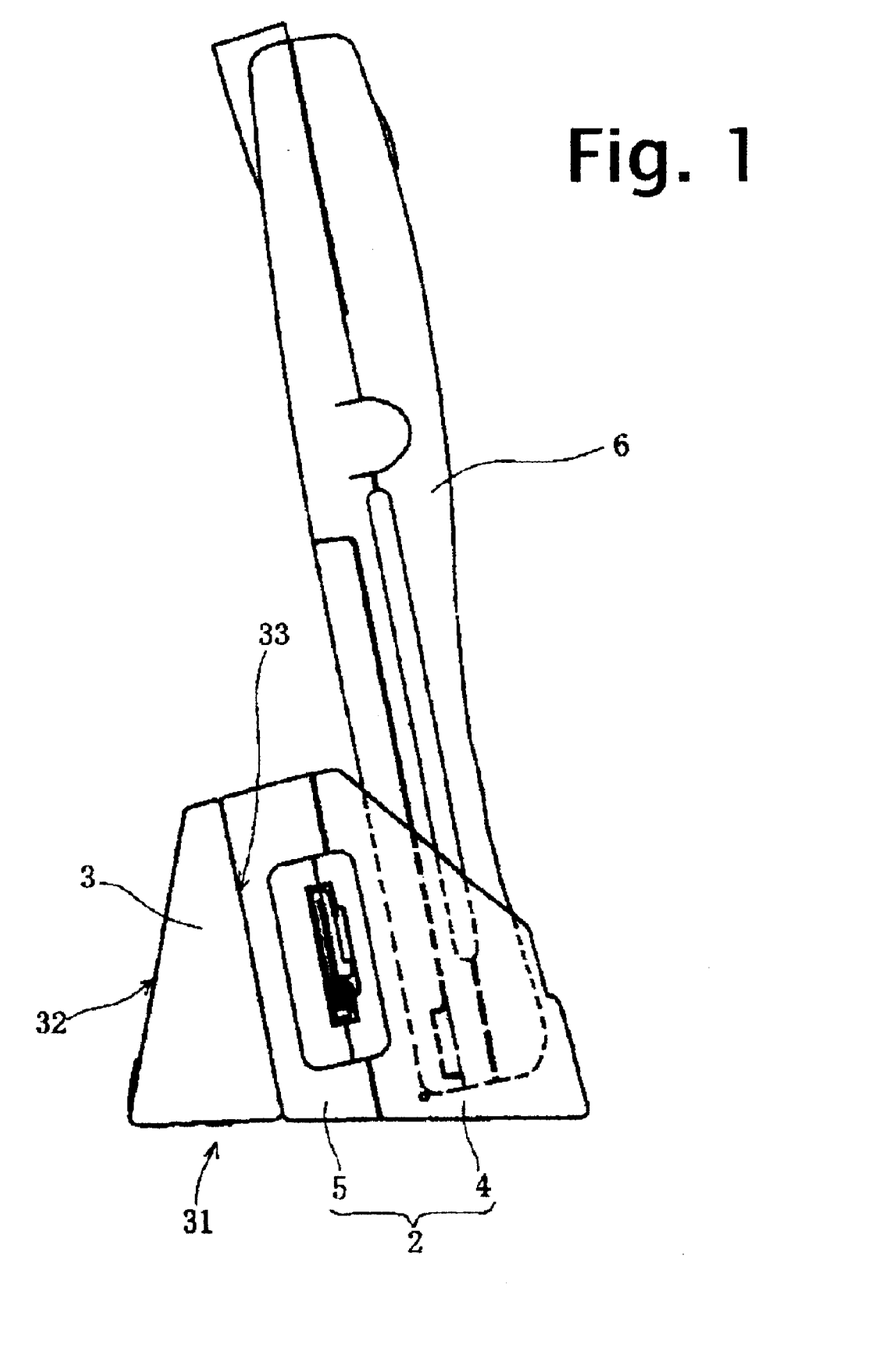
FIG. 1 shows a cellular phone mounted upright in a charging adapter according to the present invention.
Figure 2:
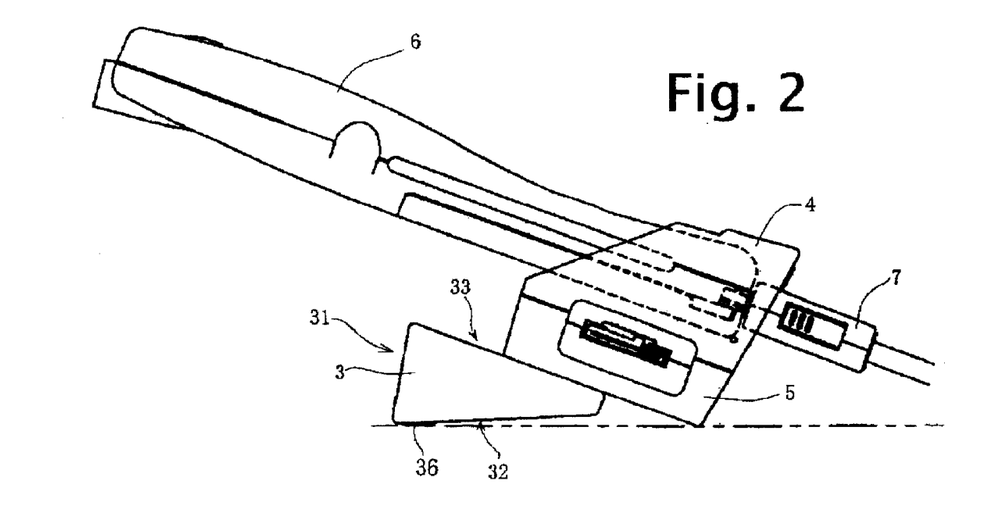
FIG. 2 shows a cellular phone mounted in a tilted state in the charging adapter according to the present invention, and is capable of conducting data communication while being charged.
Figure 3:
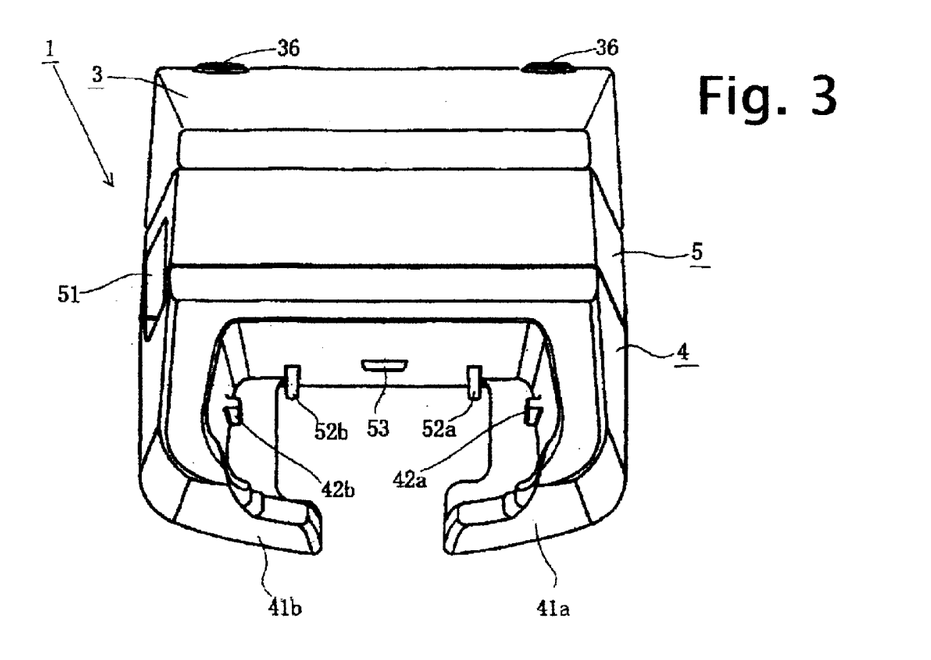
FIG. 3 is a perspective view of the charge adapter according to the present invention.
Figure 4:
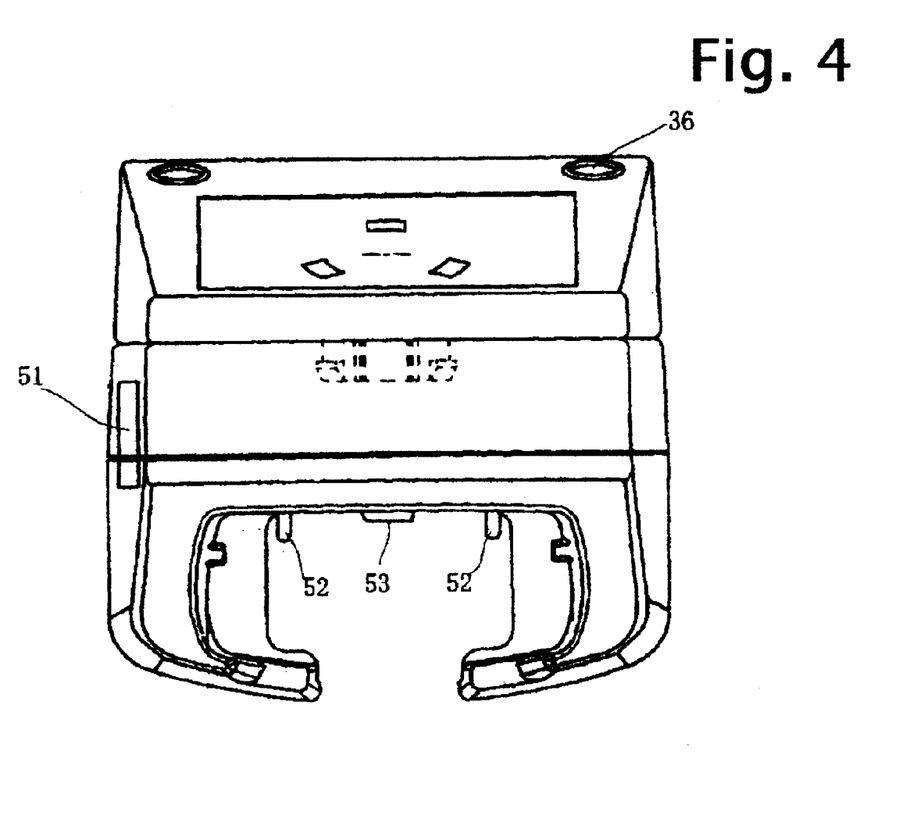
FIG. 4 is a plan view of the charge adapter.
Figure 5:
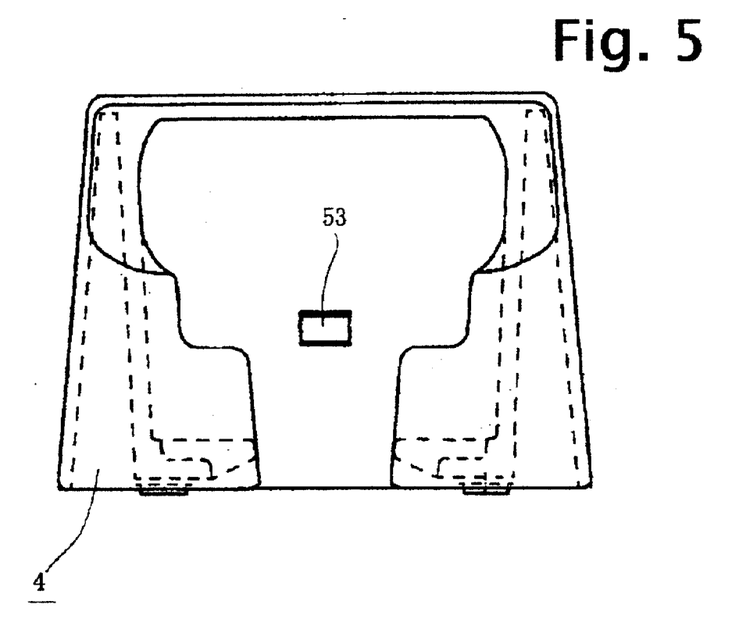
FIG. 5 is a front view of the charge adapter.
Figure 6:
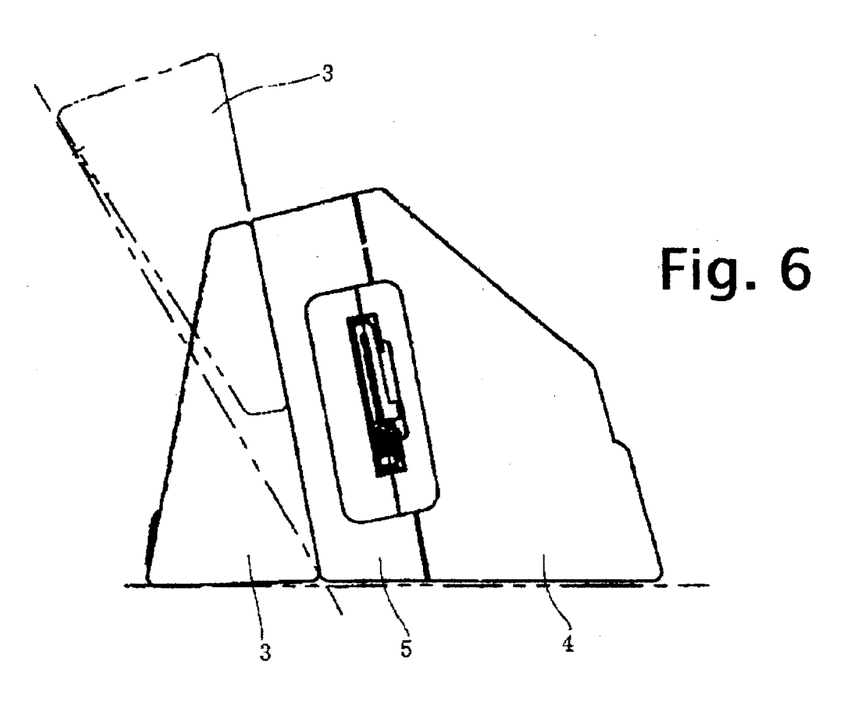
FIG. 6 is a left side view of the charge adapter.
Figure 7:
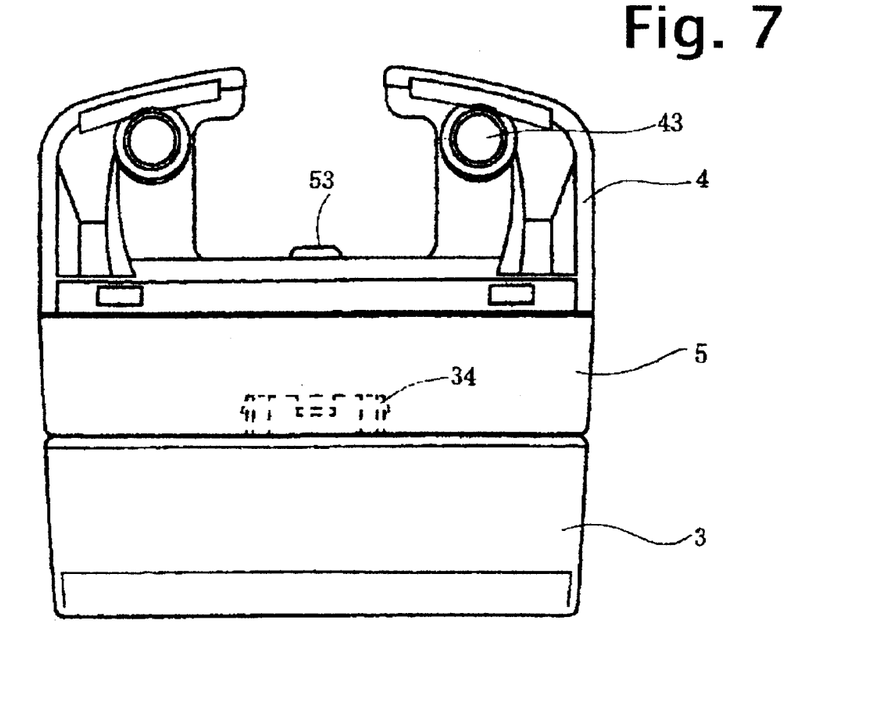
FIG. 7 is a bottom view of the charge adapter.
Figure 8:
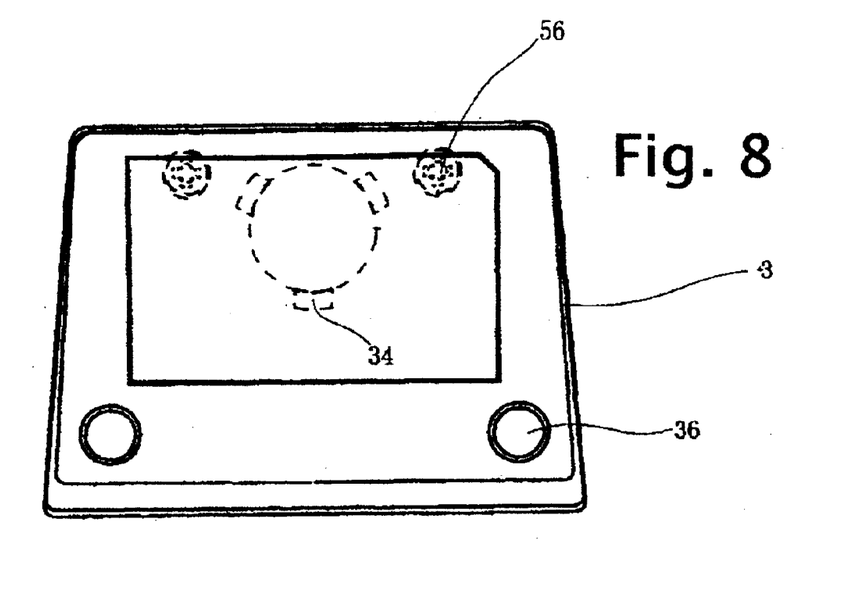
FIG. 8 is a rear view of the charge adapter.

Referring to FIGS. 1 and 2, a charge adapter 1 according to the present invention comprises a main unit case 2, and a rotor case 3. The main unit case 2 is made up of a front case 4 and a rear case 5. A first contact surface 31 and a second contact surface 32 are provided on the rotor case 3.

In FIG. 1, the charge adapter 1 is shown with the first contact surface 31 of the rotor case is facing down. A cellular phone 6 is mounted and fixed upright in the charge adapter 1.

Because the top of the cellular phone 6 is tilted slightly toward the rotor case to secure attitude stability of the cellular phone, and the rotor case has an approximately triangular prism shape with side surfaces including the first contact surface 31, the second contact surface 32, and the surface for mounting on the main unit case 33, the cellular phone 6 is stably mounted.

FIG. 2 shows the side view where the cellular phone is capable of communicating while being charged. The rotor case is rotated 180° from its orientation in FIG. 1. In this condition, the second contact surface 32 faces down. This turns the main unit case 33 horizontally such that the cellular phone is mounted in a tilted state, leaving space for connection of a data communication plug 7 at the bottom of the cellar phone.

Next, a specific example of a charge adapter according to the present invention is described.

Referring now to FIGS. 3–7, a front case 4 includes arms 41a and 41b. A bottom has an opening therethrough. Protrusions 42a and 42b for retaining a cellular phone extend inward inside the arms 41a and 41b. The protrusions 42a and 42b fit into recesses (not shown) conventionally provided at the bottom of the cellular phone for providing the mounting stability.

A lock arm 53 is installed through a coil spring in the rear case 5 for fixing the main unit of the cellular phone. An end of the lock arm 53 protrudes inside the front case.

Figure 9:
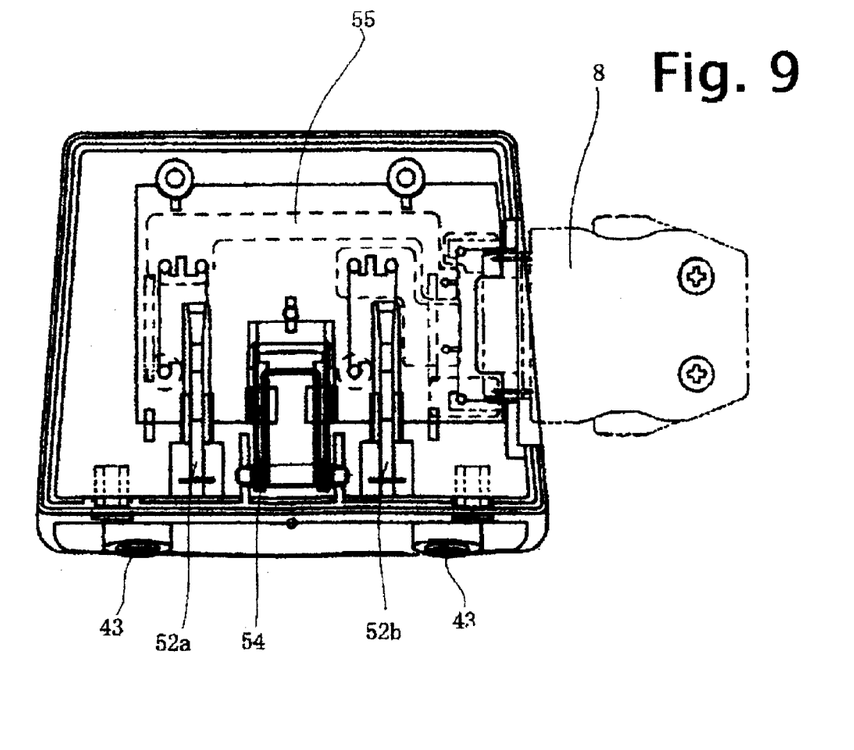
FIG. 9 shows the inside of the rear case of the charge adapter.
Figure 10:
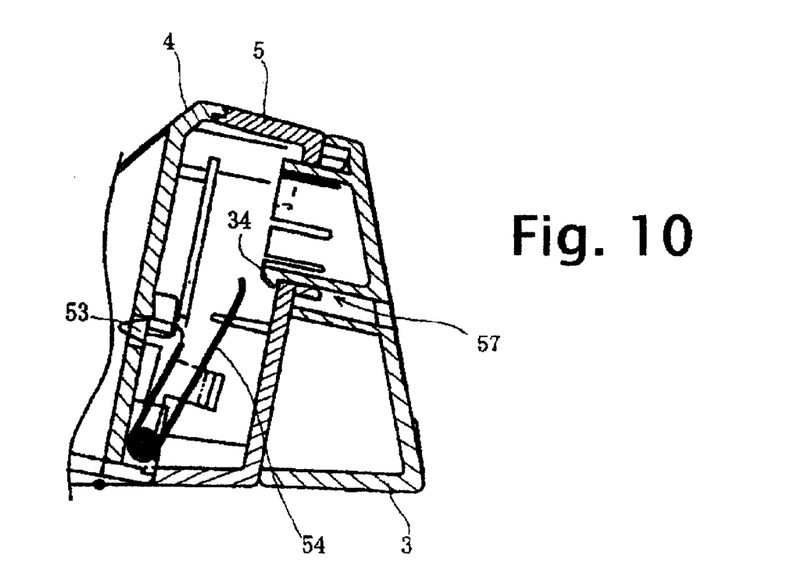
FIG. 10 shows a sectional view of a lock arm.
Figure 11:
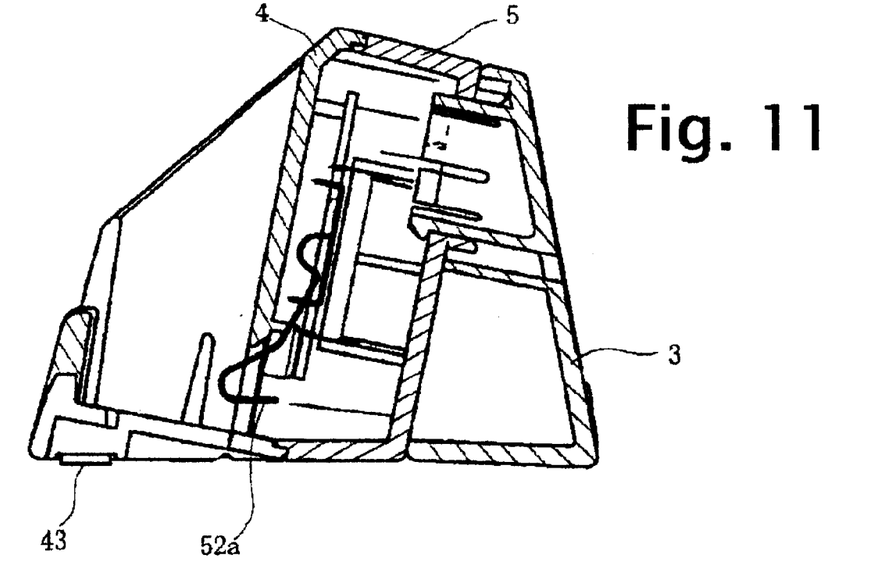
FIG. 11 shows a sectional view of charging terminals.

Referring now to FIGS. 9–11, the lock arm includes charging terminals 52a and 52b inside the rear case 5 which contact charging terminals of a battery of the cellular phone. The charging terminals 52a and 52b extend from the inside of the rear case 5 to the inside of the front case.

FIG. 9 shows the inside of the rear case seen from the rear side. The charge adapter is connected to an AC power supply through a connector 8. The charging terminals 52a and 52b are connected to a circuit substrate 55.

Figure 12:
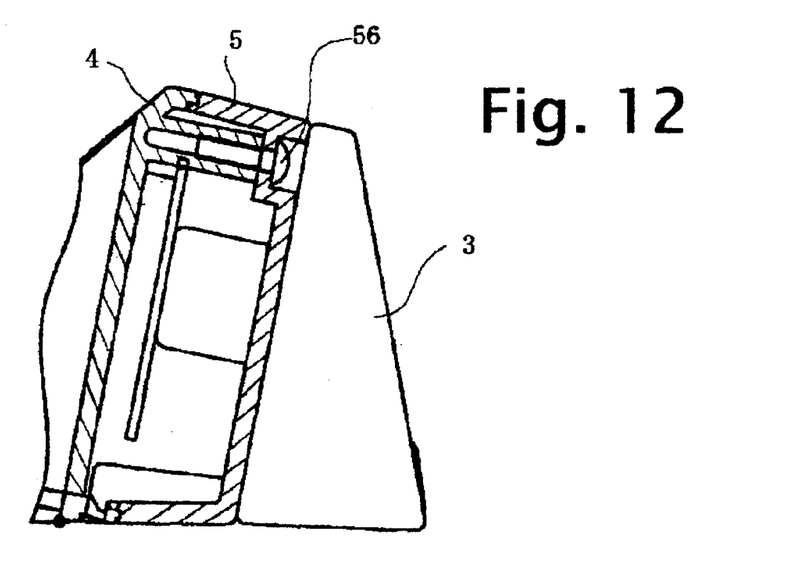
FIG. 12 shows a locking part for a front case and the rear case.

Referring now to FIG. 12, a locking member 56, such as a screw, fixes together the rear case and the front case.

Figure 14:
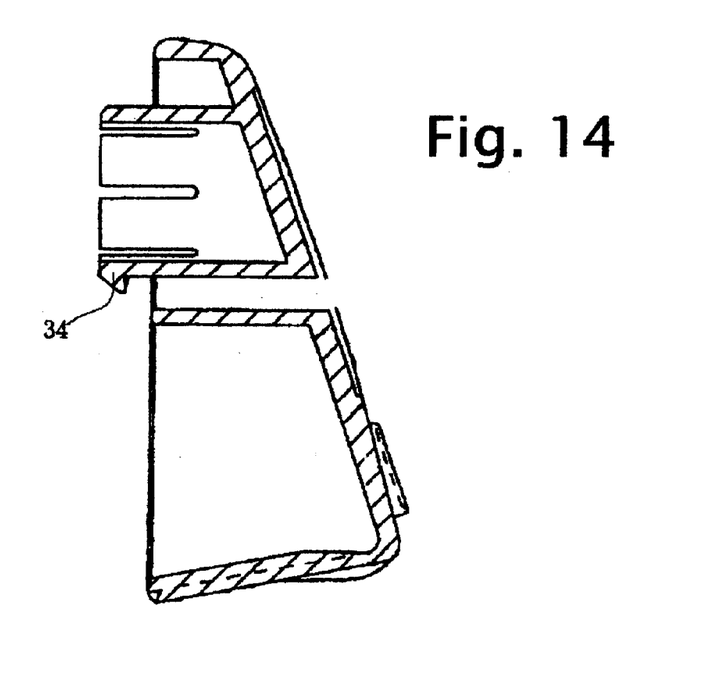
FIG. 14 shows a sectional view of the engaging part of the rotor case.
Figure 15:
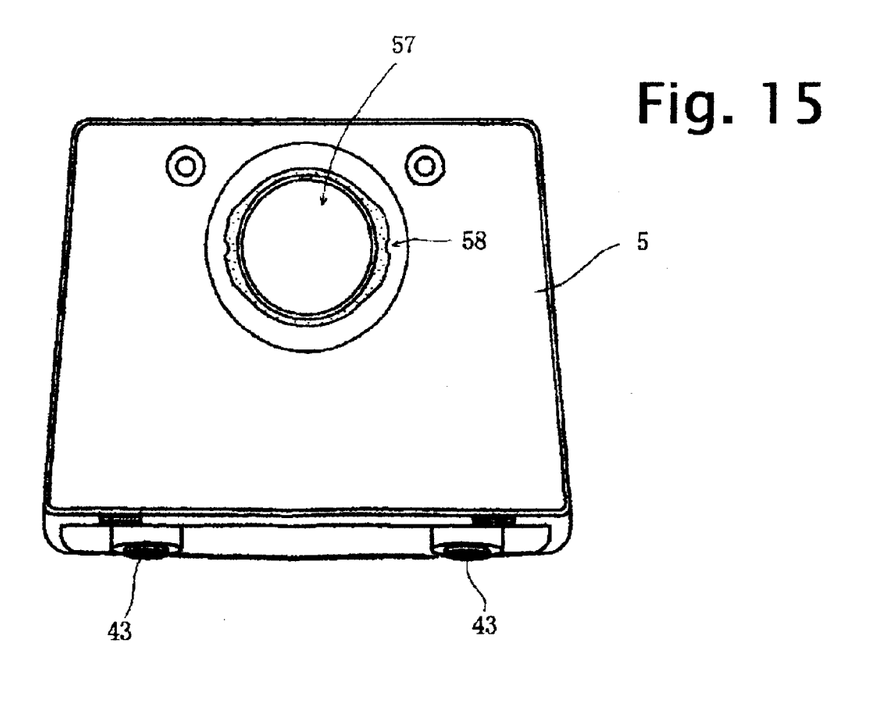
FIG. 15 shows a mounting hole of the rear case.

Referring now to FIGS. 14 and 15, the appearance of a mounting surface of the rear case is shown with the rotor case removed. Engaging recesses 58 are provided on an outer peripheral surface of an approximately circular rib which forms a mounting hole 57. A top surface of the rib is indicated with black dots for easy understanding. The rotor case is provided with a fitting piece 34.

Figure 13:
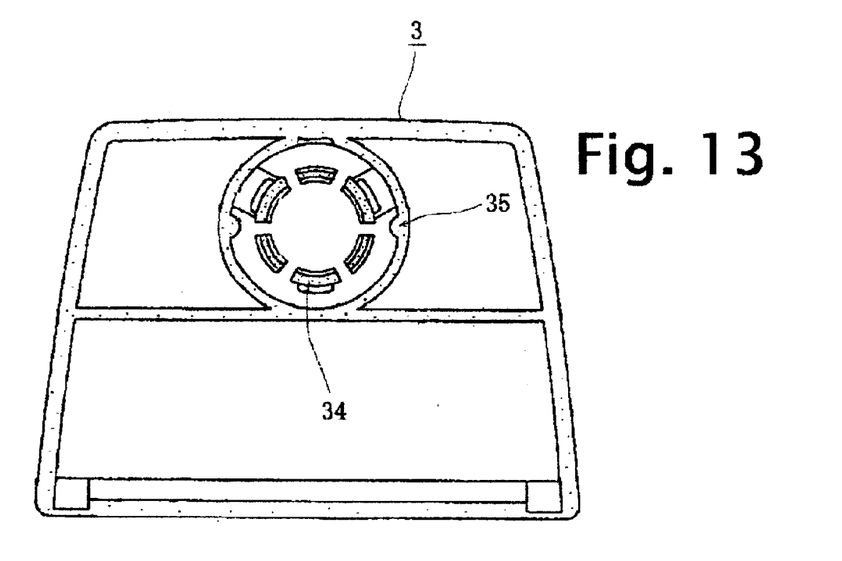
FIG. 13 shows an engaging part of a rotor case.

Referring now to FIG. 13 the fitting piece is shown with the top surface of the nib emphasized by black dots.

Referring now also to FIG. 14, the fitting piece 34 fits in the mounting hole 57 on the rear case (See FIG. 10). Fitting protrusions 35 at the bottom of the fitting pieces 34, and the fitting recesses 58 on the outer peripheral surface of the mounting hole 57, engage each other, as a detent, for fixing at every 180° turn.

Non-slip members 36 made of a rubber material or the like are attached to the second contact surface of the rotor case. Non-slip members 43, made of the same rubber material or the like, are attached to a bottom of the front case.

The main unit case and the rotor case integrally form the exterior of the charge adapter. A split line is simply set for forming the rotor case on the rear. Thus, the feature according to the present invention is added while the basic design of the charge adapter remains unchanged.

Because the rotor case is rotatably installed on the side surface of the main unit case of the charge adapter, turning the rotor case easily switches alternately between the two contact surfaces. This permits mounting the cellular phone either upright or tilted, while positioning the center of gravity of the cellular phone safely over the charge adapter.

When the cellular phone is mounted in the tilted state, because the front case has the arm shape, and has the opening at the bottom there is space to connect the data communication cable without interference. This permits data communication while charging the cellular phone.

Because the rotor case has the approximately triangular prism shape, and the turning center is eccentrically set upward in the vertical direction of the main unit case, the attitude stability for the cellular phone is excellent, and dialing buttons may be pushed while the cellular phone is mounted in the charge adapter with the rotor case turned upward by 180°.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A charge adapter comprising:
   a main unit case;
   said main unit case including a recess for mounting and fixing a main unit of a cellular phone during charging;
   charging terminals extending from an inside of said recess for contacting charging terminals of a battery of said cellar phone;

a rotor case rotatably mounted on a side surface of said main unit case;

said rotor case rot table between first and second rotation positions on said side surface of said main unit case;

said rotor case in aid first rotation position including a first contact surface for contacting a support surface when said cellular phone is mounted upright in said recess in said charge adapter; and said rotor case in said second rotation position further including a second contact surface for contacting with said support surface when said cellular phone is mounted tilted in said recess in said charge adapter.

2. The charge adapter according to claim 1, wherein:

said rotor case has a generally triangular prism shape; and said prism shape having said first contact surface and said second contact surface as side surfaces with respect to a mounting surface of said main unit case of said charge adapter.

3. The charge adapter according to claim 1, wherein a center of rotation of said rotor case is located eccentrically upward against a center in a vertical direction of said mounting surface of said main unit case of said charge adapter, whereby a center of gravity of said cellular phone is disposed over a one of said first and second contact surfaces which contacts said support surface.

4. The charge adapter according to claim 1, wherein:

said charging terminals are connected to a circuit substrate.

5. The charge adapter according to claim 1, wherein:

said charge adapter further comprises a connector for connection to an AC power supply.

6. The charge adapter according to claim 1, wherein:

a bottom of said recess for mounting and fixing said cellular phone has an opened arm shape; and said recess including space for permitting insertion of a plug of a data communication cable from said bottom side of said main unit case through said arm shape when said cellular phone is mounted tilted.

7. The charge adapter according to claim 6, wherein:

said rotor case is in a generally triangular prism shape; and said prism shape having said first contact surface and said second contact surface as side surfaces with respect to a mounting surface of said main unit case of said charge adapter.

\* \* \* \* \*